United States Patent [19]

Gross

[11] Patent Number: 4,616,417
[45] Date of Patent: Oct. 14, 1986

[54] HYDRAULIC SHEAR HEAD ATTACHMENT FOR BACKHOE OR THE LIKE

[75] Inventor: Sol N. Gross, Pittsburgh, Pa.

[73] Assignee: AAA Steel and Enterprises Corp., North Versailles, Pa.

[21] Appl. No.: 689,413

[22] Filed: Jan. 7, 1985

[51] Int. Cl.⁴ ............................................. B23P 19/00
[52] U.S. Cl. ....................................... 30/134; 30/267; 83/609; 144/34 E
[58] Field of Search ................. 30/134, 228, 227, 245, 30/251, 254, 266, 267, 270, 231; 83/610–611, 612, 609; 144/34 E

[56] References Cited

U.S. PATENT DOCUMENTS

| | | | |
|---|---|---|---|
| 619,195 | 2/1899 | Loffi | 30/267 |
| 2,372,242 | 3/1945 | Wilson | 30/267 |
| 3,486,227 | 12/1969 | Somervell | 30/267 |
| 4,188,721 | 2/1980 | Ramun et al. | 30/134 |
| 4,403,431 | 9/1983 | Ramun et al. | 144/34 E |
| 4,450,625 | 5/1984 | Ramun et al. | 30/134 |
| 4,519,135 | 5/1985 | LaBounty | 30/134 |
| 4,543,719 | 10/1985 | Pardoe | 83/609 |

Primary Examiner—John Sipos
Assistant Examiner—Donald R. Studebaker
Attorney, Agent, or Firm—Reed Smith Shaw & McClay

[57] ABSTRACT

A hydraulic shear attachment means for construction equipment having a support arm for pivotal attachment to said construction and a lower jaw for shearing. The arm includes flange members positioned on either side of the lower jaw to support the pivotable upper jaw. Arcuate tracks are positioned in the support flanges to receive a support pin extending through the upper shear jaw which rides in said tracks during actuation of the upper jaw.

3 Claims, 7 Drawing Figures

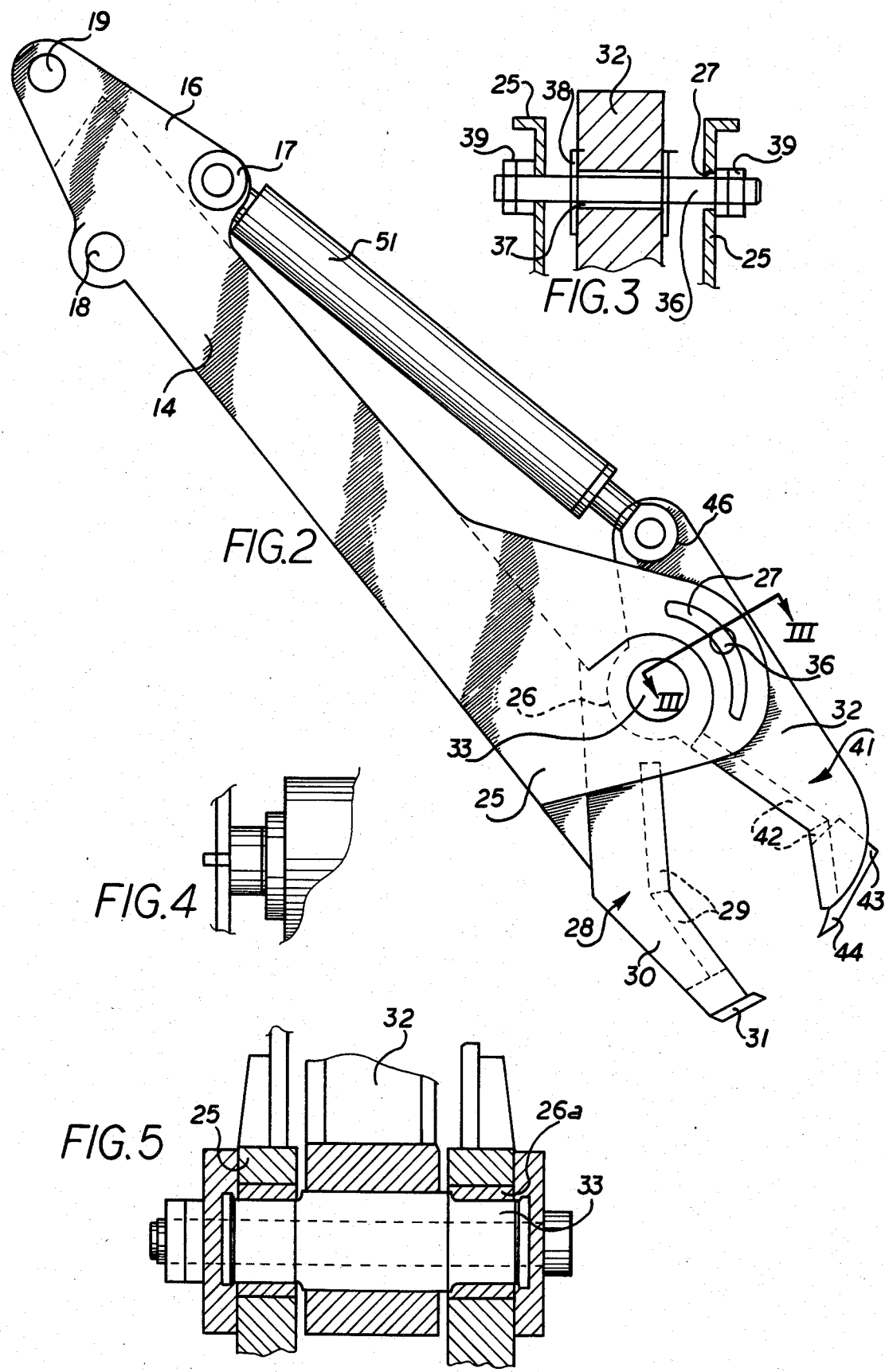

HYDRAULIC SHEAR HEAD ATTACHMENT FOR BACKHOE OR THE LIKE

FIELD OF THE INVENTION

The invention relates to a material handling and shear attachment means for a backhoe or front end loader, and, in particular, to a shear attachment having an arcuate guide means to support the upper jaw member.

BACKGROUND OF THE INVENTION

Hydraulic shear attachments for use with backhoes are well known. Examples of improvements in such devices are set forth in the following U.S. Patents: U.S. Pat. Nos. 4,188,721; 4,198,747; 4,376,340 and 4,403,421.

Hydraulic shear attachments, when mounted on a backhoe or front end loader, are used in dismantling large equipment and in scrap preparation. Hydraulic shear attachments are particularly useful in the demolition of building structures that include or have as part of their support large steel beams or steel reinforced concrete support members. The shear attachment can handle or remove these large metal beams, pipes, tanks and other objects from the structure while working at a safe distance from the point of demolition. Most importantly, the shear means are used in cutting metal beams and pipes in place for faster, safer demolition. This type of shear also is useful in scrap handling applications where mobility of the shear is important.

Because these devices are used to cut large beams, pipes and other metal objects at elevated heights from the ground, mobility is important as well as weight. It is important that the shear attachment be designed and constructed so as not to be excessively heavy thereby diminishing the handling capacity of the overall device. Reduction in weight has resulted in excessive wear of the bearing and pivot used to mount the jaws resulting from the lack of adequate support during operation of the jaw means.

In currently designed shear attachments a fixed lower jaw member and an upper jaw are movable about a pivot point, normally by a hydraulic piston. Because of this movement about the pivot and the lack of lateral support for the jaw assembly, lateral forces which impact upon the upper jaw and the pivot means, particularly when in an elevated position, create excessive wear. This wear results in the breaking down and being out of service for significant periods of time.

Accordingly, it is an object of the present invention to provide a hydraulic shear attachment means having improved wear and strength capabilities. The improvements of the present invention reduce the amount of down time encountered because of the large lateral forces imparted upon the pivot and jaw means of the shear.

SUMMARY OF THE INVENTION

Generally, the improvements provided by the present invention includes an arcuate support track to reduce lateral forces on the jaw member of the shear. The shear attachment means of the invention attaches to a backhoe, front end loader or like construction equipment and includes a lower jaw means having a fixed support arm with attachment means at one end to mount to the boom of a backhoe. At the other end of the support arm is a means for pivotally attaching an upper jaw member which includes a pair of spaced apart mounting flanges comprising the respective outside end portions of the arm. Each flange member is provided with a pivot housing and an arcuate opening concentrically positioned above said pivot housing. The lower jaw member is provided with an adjustable and removable knife means.

An upper jaw member is pivotally mounted to the support arm at said pivot housing by means of a pivot pin. Additionally, the upper jaw member includes a support pin mounted to extend through said arcuate openings so as to ride therein during pivotal rotation of the upper jaw. The upper jaw is attached to one end of a hydraulic cylinder positioned between said jaw and the support arm. The lower jaw also includes a removable knife member to shearing material placed between the upper and lower jaws.

Other advantages of the present invention will become apparent from a perusal of the following detailed description of a presently preferred embodiment taken in connection with the accompanying drawings.

BRIEF DESCRIPTION OF THE DRAWINGS

FIG. 2 is a side elevation (enlarged) of the reverse side of the attachment means;

FIG. 3 is a partial section taken through line III—III of FIG. 2;

FIG. 4 is an enlarged elevation of the end portion of the guide pivot means; and FIG. 5 is a section taken through a line perpendicular to the plane of the drawing, having its axis coincident with the apex of the main pivot pin;

PRESENTLY PREFERRED EMBODIMENT

Figure 1:
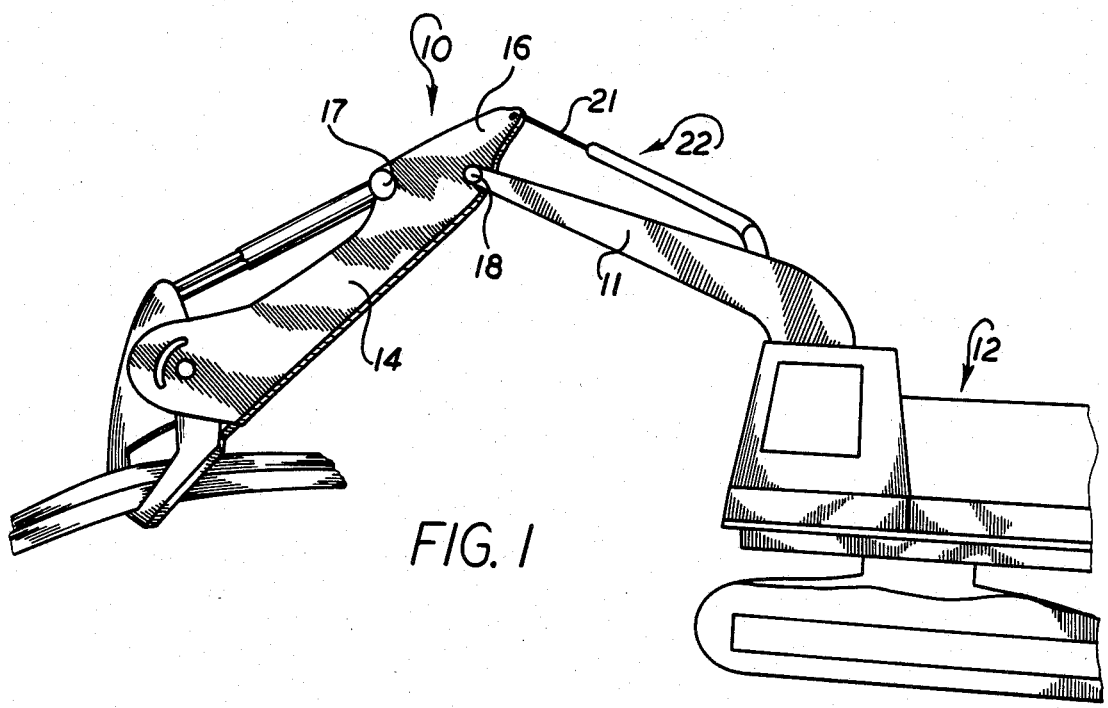
FIG. 1 is a side elevation showing the hydraulic shear attachment mounted to a backhoe.

Referring to FIG. 1, shear attachment means 10 of the present invention is mounted to boom 11 of backhoe 12. Shear attachment 10 includes support arm 14 having a pair of attachment flanges 16 at one end of the arm. Support arm 14 is preferably tapered from flange 16 to its other end so that attachment flange 16, as shown more clearly in FIG. 2, has a low profile between pivot openings 17 and 18. It is also to be understood that support arm 14 can also be configured within the scope of the present invention to fit other types of equipment such as front end loaders and the like. Thus, pivot opening 18 is located to pivotally receive a mounting pin, not shown, to mount attachment 10 to boom 11 or similar securing means.

Figure 6:
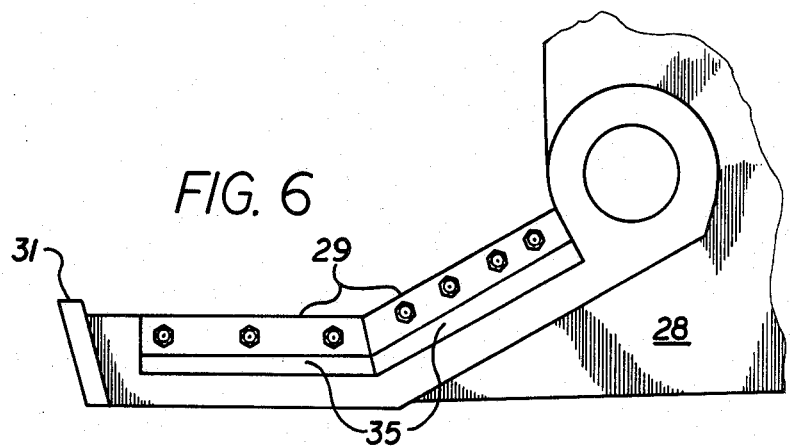
FIG. 6 is an enlarged partial elevation of the lower jaw showing the knife saddles.
Figure 7:
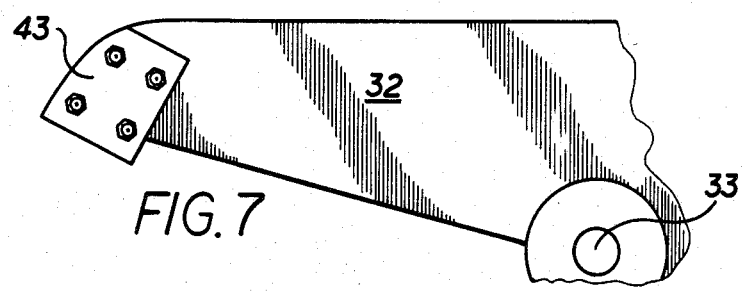
FIG. 7 is an enlarged partial elevation of the upper jaw member.

As more clearly shown in FIG. 2, support arm 14 includes a pair of mounting flanges 25 used for mounting and supporting a movable jaw means. Each mounting flange 25 includes pivot housing 26 having bearings 26a and arcuate opening 27 positioned concentrically above the axis of pivot housing 26. Mounted to support arm 14 and between flanges 25 is lower jaw member 28. Jaw member 28 includes end means 30 which incorporates a knife means 29 and a high resistance bar 31 used in demolition work as shown in FIG. 6. Bar 31 may be removed where the application does not call for the digging action required in building demolition, for example, knife means 29 has blades made from a hard carbide steel which are mounted in saddles 35 fabricated in jaw 28. The blades can be easily removed for sharpening or for adjusting the bite.

Referring to FIG. 3, support pin 36 and arcuate openings 27 provide additional support to pivot 33 by preventing flanges 25 from separating under lateral stress. Pin 36 extends through arcuate opening 37 in upper jaw 32 and is secured in bearing 38. Pin 36 is retained therebetween by means of adjusting/lock nuts 39 threaded to pin 36. Pin 36 rides in the race formed by the periphery of opening 27. Preferably, opening 27 is concentrically positioned about the axis of pivot 33 and has a length sufficient to permit full articulation of the upper jaw 32.

Upper jaw 32 includes knife means 41 comprising a pair of carbide blades 42 mounted in saddles in the jaw in a manner similar to knives 29 of lower jaw 28. A removable wear plate 43 having punching tool 44 is mounted thereon. Punching tool 44 is particularly useful in demolition work. Wear plate 43 may be removed after wear instead of having to replace the entire jaw assembly. Likewise, bar 31 on lower jaw 28 may serve the same purpose.

Positioned between pivot opening 17 and opening 46 on the upper jaw 32 is hydraulic cylinder 51. Cylinder 51 is used to rotate upper jaw 32 about pivot 33. Because of the lower profile of support arm 14 and the position of cylinder 51, increased mechanical movements can be achieved by upper jaw 32. The present invention thus provides significantly improved shearing action. Lateral support to the cutting jaws via pin 36 sliding in slot 27 reduces the wear normally encountered by prior art machines.

While a presently preferred embodiment of the invention has been shown and described in particularity, the invention may be otherwise embodied within the scope of the appended claims.

What is claimed is:

1. A hydraulic shear attachment means for backhoes and the like, comprising:
  (a) a support arm having at one end means for pivotal attachment to a backhoe or like equipment and at its other end a lower jaw member, said arm including a pair of spaced-apart flange members juxtaposed with respect to said lower jaw, each of said flange members having a pivot housing and an arcuate opening concentrically positioned with respect to the axis of said pivot housing;
  (b) an upper jaw member pivotably mounted to and disposed between said pivot housings and having at least one support pin extending through said arcuate opening so as to ride therein during rotation of said upper jaw, said upper jaw including means for pivotably mounting at its other end a hydraulic actuating means;
  (c) retaining means secured on each end of said support pivots to maintain said flanges in their spaced-apart, upright position; and
  (d) hydraulic actuating means mounted to said upper jaw mounting means and the support arm at said attachment means for actuating the upper jaw.

2. A shear attachment means as claimed in claim 1, wherein said upper and lower jaw members each includes a knife mounting saddle means adapted to receive a knife blade and knife blades adjustably mounted within said saddles.

3. A shear attachment means as claimed in claim 1, wherein each of said upper and lower jaws includes a wear plate at its working end.

* * * * *